Patented Mar. 2, 1926.

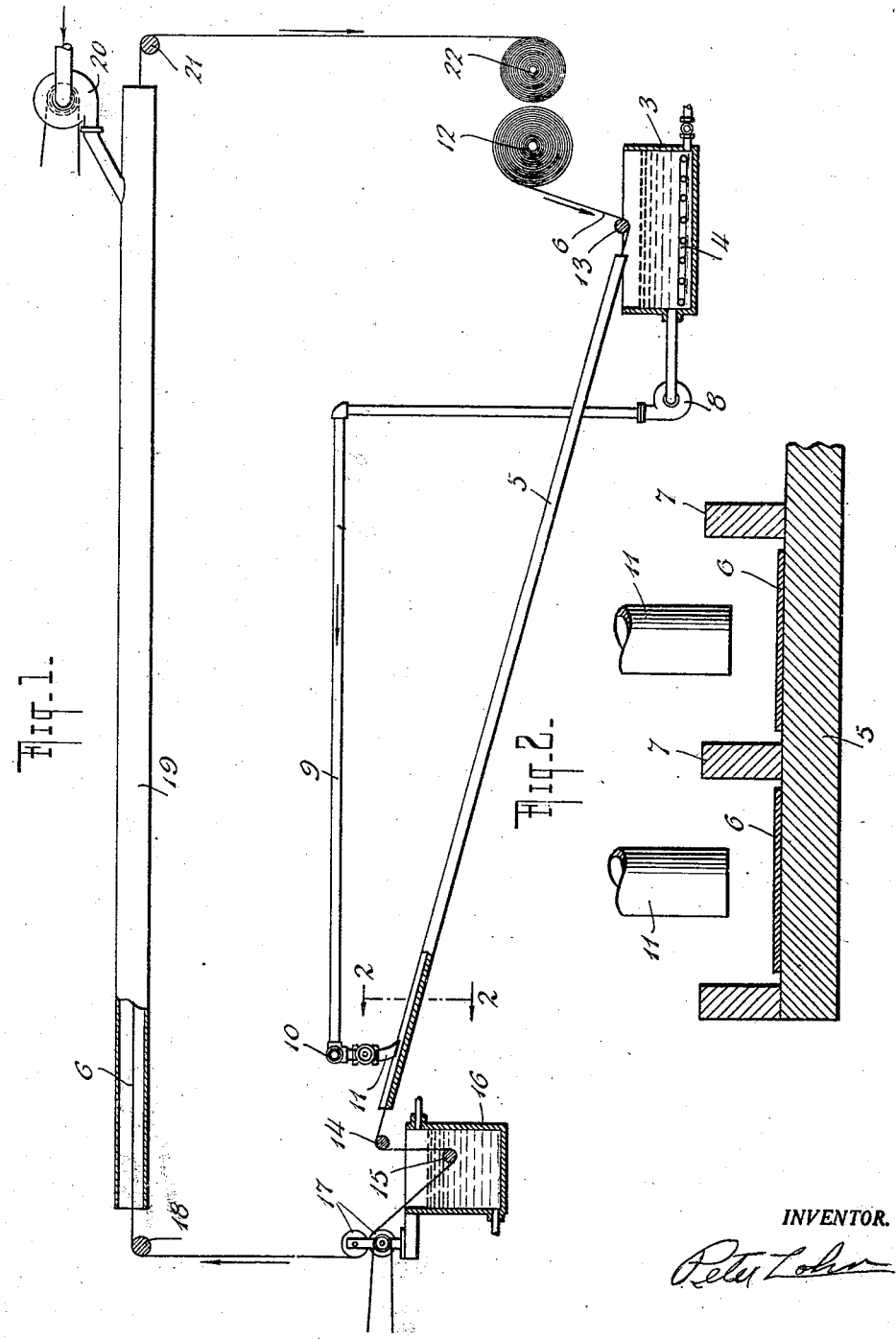

1,575,346

UNITED STATES PATENT OFFICE.

PETER LOHN, OF FORT LEE, NEW JERSEY.

METHOD AND APPARATUS FOR TREATING CINEMATOGRAPHIC FILMS.

Application filed August 31, 1925. Serial No. 53,761.

*To all whom it may concern:*

Be it known that I, PETER LOHN, a citizen of the United States, and a resident of Fort Lee, in the county of Bergen and State of New Jersey, have invented certain new and useful Improvements in Methods and Apparatus for Treating Cinematographic Films, of which the following is a specification.

This invention relates to improvements in methods and apparatus for the treatment of cinematographic films, and has particular reference to the removal of the gelatinous sensitized emulsion forming the coating for said films.

By various methods, it has heretofore been the practice to remove the sensitized emulsion from old films, no longer used for reproduction, in order to reclaim the silver contents of the emulsion and to restore the cellulous base to its original state before the application of the emulsion thereto. This base which consists, among other ingredients, of gun cotton, camphor and collodium is divided into its constituent parts or dissolved for the purpose of making paints or the like.

One known method of reclaiming the silver from the emulsion has been to burn the entire film and thereafter refine the ashes. This method meets with the objection that the base of the film and other ingredients of the emulsion are destroyed.

Another method consists in dipping, by hand, the unrolled film in several baths of a removing agent such as caustic soda until the emulsion has been removed, after which the same is refined to reclaim the silver content. The base, after the emulsion is removed, is dried usually for a period of about twenty-four hours and thereafter baled. This dipping and drying process consumes such a great amount of time as to render the same very expensive and furthermore a considerable fire risk is encountered in the baling of the cellulose base of the film.

It is proposed, by the present invention, to overcome the difficulties of known methods and to greatly facilitate the removal of the sensitized emulsion from the film preparatory to reclaiming the silver content by utilizing the force created by a flowing liquid to remove the emulsion from the film which is being passed through said liquid in an opposite direction to the flow thereof. In so doing, the film is passed from a feed magazine to a take-up device and in the interim, the emulsion is removed and the base of the film thoroughly dried.

The inventive idea is capable of receiving a variety of mechanical expressions, one of which, for purposes of illustration, is shown in the accompanying drawing, but it is to be expressly understood that said drawing is used solely for the purpose of facilitating the description of the invention as a whole and not to define the limits thereof, reference being had to the appended claims for this purpose.

In the drawing—

Figure 1 is a side elevation, partly in section, showing more or less diagrammatically the apparatus for carrying out the invention; and Figure 2 is an enlarged section on the line 2—2 of Figure 1.

In its preferred form, the apparatus consists of a tank 3 for containing a removing agent containing about five per cent caustic soda which is heated to a temperature of about 135° F., as by a heating coil 4 within the tank. It has also been found in actual practice that pure water heated to a temperature of about 200° F. will remove the emulsion from the film, but not quite as effectively as the caustic soda solution. An inclined sluiceway 5 about thirty feet in length is supported above the tank with its lower end overhanging the same so that the solution, which is pumped from the tank to the upper end of the sluiceway will re-enter said tank after having the film 6 passed therethrough. In order that a plurality of films may be washed simultaneously, the sluiceway is divided into the desired number of channels by longitudinal partitions 7 the distance between which is slightly greater than the width of the films to permit of a limited lateral movement thereof while being passed along said channels.

In order to provide for a continuous circulation of the solution from the tank through the sluiceway, the former has connected thereto a centrifugal pump of any desired construction and conventionally shown at 8 which operates to pump the solution through a feed pipe 9 to the header 10. This header is arranged transversely above the upper end of the sluiceway and has depending therefrom a plurality of valved branches 11 equal in number to the number of channels in the sluiceway, each branch being arranged directly above its associated channel and its valve being utilized to control the amount of the washing solution flowing into and downwardly along the channel.

Each film 6 to be treated is preferably wound upon a reel 12 which may be placed in a feed magazine such as employed in connection with cinematographic apparatus and is fed around an idler 13 above the tank 3 and into the lower end of the sluiceway with the side of the film containing the coating of sensitized emulsion uppermost so as to receive the full effect of the removing agent flowing downwardly as the film is moved in the opposite direction at a speed of about thirty feet per minute. It has been found in actual practice that this operation of moving the film upwardly through a flowing removing agent is very effective in thoroughly removing the entire coating of sensitized emulsion from the base of the film during its passage through the sluiceway. The removed gelatinous emulsion is carried downwardly into the tank 3 where it settles upon the bottom of the tank from whence it may be periodically removed for refining in any well known manner.

After passing from the upper end of the sluiceway each length of film may be led around idlers 14 and 15 the latter of which is positioned within a tank 16 through which water is being constantly circulated to wash the film before the same enters the drying stage. Any emulsion which may have adhered to the film after passing from the sluiceway will be removed in this bath from which it may be reclaimed and refined. It is to be understood, however, that the amount of emulsion adhering to the film after being treated with the caustic soda solution is almost negligible and for this reason the tank 16 may be dispensed with if desired.

Each film is now passed through the pressure rollers 17 which are power driven from any suitable source (not shown), the operation of said rollers being used to draw the film from the reel 12, maintain the same in a taut condition and remove therefrom most of the solution or water which may have adhered to the base of the film after it passes from the sluiceway and through the tank 16.

From the rollers 17, each film is passed around an idler 18 and from thence through a drying tube or chamber 19, which is preferably at least of a length equal to that of the sluiceway 5. Adjacent one end of the tube the same has connected thereto a pump 20 for injecting a blast of hot air into the tube and against the portion of the film passing therethrough. This hot air acts to thoroughly dry the film so that upon its exit from the tube and around the idler 21 it may immediately be rewound upon a reel 22 forming a part of a take-up device of any known construction. A take-up device such as used in cinematographic apparatus is preferable as these devices are provided with an automatic shut-off which will prevent ignition of the portion of the film upon the reel should any other part of the film become ignited.

It will be apparent that the use of the reels 12 and 22 greatly facilitates the handling of the film both during and after the treatment thereof with the present apparatus.

What is claimed is:

1. An apparatus for the removal of the sensitized emulsion from cinematographic films including a sluiceway, means for feeding a removing agent to said sluiceway, and means for moving a film along said sluiceway in an opposite direction to the flow of the removing agent therein.

2. An apparatus for the removal of the sensitized emulsion from cinematographic films including a sluiceway, means for feeding a removing agent to said sluiceway, means for moving a film along said sluiceway in an opposite direction to the flow of the removing agent therein, and a drying chamber through which the film is passed after leaving said sluiceway.

3. An apparatus for the removal of the sensitized emulsion from cinematographic films including a sluiceway, means for feeding a removing agent to said sluiceway, means for moving a film along said sluiceway in an opposite direction to the flow of the removing agent therein, means for further treating said film after the emulsion has been removed therefrom by said agent, and a drying chamber through which the film is passed after being treated by the last named means.

4. An apparatus for the removal of the sensitized emulsion from cinematographic films including a sluiceway, means for feeding a removing agent to said sluiceway, and means operable to move a film along said sluiceway and through said agent and to remove moisture from the said film after it has passed through the agent.

5. An apparatus for the removal of the sensitized emulsion from cinematographic films including a sluiceway, means for feeding a removing agent to said sluiceway, means operable to move a film along said sluiceway and through said agent and to remove moisture from the said film after it has passed through the agent, and a drying chamber through which the film is passed after having the moisture removed therefrom.

6. An apparatus for the removal of the sensitized emulsion from cinematographic films including a sluiceway, means for feeding a removing agent to said sluiceway, means operable to move a film along said sluiceway and through said removing agent and to remove moisture from the said film after it has passed through the agent, a washing tank interposed between said sluiceway and the last named means, and a drying chamber through which the film is passed after having the moisture removed therefrom by said last named means.

7. An apparatus for the removal of the sensitized emulsion from cinematographic films including a tank for containing a removing agent, a sluiceway having one end above said tank, means for pumping the removing agent from said tank to the other end of said sluiceway, and means for moving a film along said sluiceway in an opposite direction to that of the flow of said agent therein.

8. An apparatus for the removal of the sensitized emulsion from cinematographic films including a tank for containing a removing agent, a sluiceway having one end above said tank, means for pumping the removing agent from said tank to the other end of said sluiceway, and pressure rollers adjacent said other end of the sluiceway and operable to move a film along the sluiceway and through said removing agent and to remove moisture therefrom after passing through said agent.

9. An apparatus for the removal of the sensitized emulsion from cinematographic films including a tank for containing a removing agent, a sluiceway having one end above said tank, means for pumping the removing agent from said tank to the other end of said sluiceway, a feed reel from which the film is passed into the first named end of said sluiceway, means adjacent said other end of the sluiceway for drawing the film from said reel and moving the same in the sluiceway and for removing moisture from the film after having passed through said removing agent, a drying chamber through which the film is passed after the removal of the moisture therefrom, and a take-up reel for receiving the film after being dried in said chamber.

PETER LOHN.